July 13, 1926.
M. G. HANSON
HANDLE
Filed Nov. 23, 1925
1,592,204
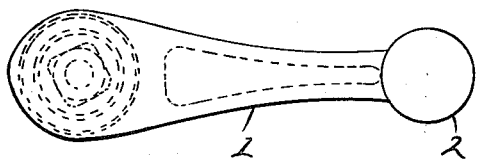
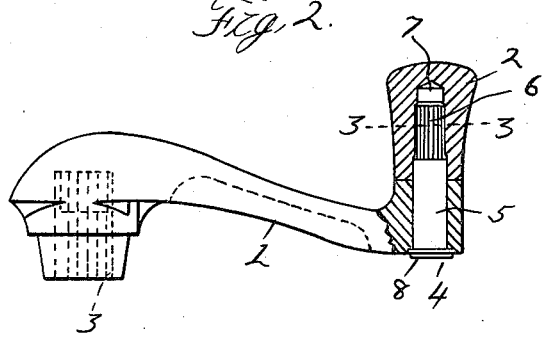
Inventor
Miles G. Hanson
By Whittemore Hulbert Whittemore
 +Belknap
Attorneys Patented July 13, 1926.

1,592,204

UNITED STATES PATENT OFFICE.

MILES G. HANSON, OF TOLEDO, OHIO, ASSIGNOR TO THE DURA COMPANY, OF TOLEDO, OHIO, A CORPORATION OF DELAWARE.

HANDLE.

Application filed November 23, 1925. Serial No. 70,876.

The invention relates to a handle and is particularly applicable to a handle including an arm and a knob such as used in window regulators. One of the objects of the invention is to so construct the handle that the knob and the arm may be formed and plated independently of each other and assembled after they are completely finished. Other objects of the invention reside in the novel features of construction and combinations and arrangements of parts as more fully hereinafter set forth.

In the drawings:—

Figures 1 and 2 are elevations at right angles to each other of a handle embodying my invention, Figure 2 being shown partly in section;

Figure 3 is a cross section on the line 3—3 of Figure 1.

1 is the arm and 2 the knob of a handle such as used in window regulators, one end of the arm being provided with a transverse recess 3 for engagement with a suitable drive shaft, while the other end of the arm has connected thereto the knob. 4 is a pin having the portion 5 extending transversely of and journaled in the free end of the arm and also having the reduced serrated outer end portion 6 which is forced into the recess 7 extending axially of the knob 2. The serrations cut into and displace the material forming the knob and force this material into firm engagement with the pin to thereby securely fix the knob upon the pin. The knob abuts the outer side of the arm and the inner end of the pin has the head 8 which abuts the inner side of the arm to retain the knob against the arm.

With this arrangement both the arm and the knob may be formed independently of each other as well as plated independently of each other and they are completely finished before being assembled. Decided advantages are secured by reason of this construction such as facilitating the forming of the arm and knob and plating and buffing the same. Also saturation by the plating solution or seepage by graphite of the joint between the arm and knob is avoided.

What I claim as my invention is:

1. In a handle, the combination with an arm and a knob, of a pin journaled in said arm and having a serrated portion displacing and firmly engaging a portion of said knob.

2. In a handle, the combination with an arm and a knob at the free end of said arm, of a pin inserted into said knob from the inner side of said arm, said pin having a head for abutting the inner side of said arm, an adjacent portion journaled in said arm and a serrated portion forced into and displacing and firmly engaging a portion of said knob.

3. In a handle, the combination with an arm and a knob, of a pin having a portion journaled in and extending transversely of said arm and a reduced serrated portion located in said knob and displacing and firmly engaging the material forming said knob.

4. In the manufacture of a handle including an arm and a knob, the forming of the arm and knob independently of each other, the finishing of the arm and knob independently of each other, the forcing of a pin into a recess of the knob to displace a portion of the material forming the knob and firmly unite the knob with the pin and the journaling of the pin in the knob.

In testimony whereof I affix my signature.

MILES G. HANSON.